(12) United States Patent
Kahn et al.

(10) Patent No.: US 8,678,925 B1
(45) Date of Patent: Mar. 25, 2014

(54) METHOD AND APPARATUS TO PROVIDE A DICE APPLICATION

(75) Inventors: Philippe Kahn, Aptos, CA (US); Arthur Kinsolving, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 174 days.

(21) Appl. No.: 12/483,213

(22) Filed: Jun. 11, 2009

Related U.S. Application Data (60) Provisional application No. 61/060,771, filed on Jun. 11, 2008.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................................. 463/37; 463/1; 463/36

(58) Field of Classification Search
USPC .................................................. 463/1, 36, 37
See application file for complete search history.

(56) References Cited

U.S. PATENT DOCUMENTS

| | | |
|---|---|---|
| 5,654,619 A | 8/1997 | Iwashita |
| 6,115,717 A | 9/2000 | Mehrotra et al. |
| 6,347,290 B1 | 2/2002 | Bartlett |
| 6,353,449 B1 | 3/2002 | Gregg et al. |
| 6,771,250 B1 | 8/2004 | Oh |
| 6,834,249 B2 | 12/2004 | Orchard |
| 6,975,959 B2 | 12/2005 | Dietrich et al. |
| 7,054,784 B2 | 5/2006 | Flentov et al. |
| 7,057,551 B1 | 6/2006 | Vogt |
| 7,451,056 B2 | 11/2008 | Flentov et al. |
| 7,457,719 B1 | 11/2008 | Kahn et al. |
| 7,467,060 B2 | 12/2008 | Kulach et al. |
| 7,487,463 B2 | 2/2009 | Johnson |
| 7,512,515 B2 | 3/2009 | Vock et al. |
| 7,526,402 B2 | 4/2009 | Tenenhaus et al. |
| 7,608,050 B2 | 10/2009 | Sugg |
| 7,640,804 B2 | 1/2010 | Daumer et al. |
| 7,647,196 B2 | 1/2010 | Kahn et al. |
| 7,653,508 B1 | 1/2010 | Kahn et al. |
| 7,752,011 B2 | 7/2010 | Niva et al. |
| 7,774,156 B2 | 8/2010 | Niva et al. |
| 7,857,772 B2 | 12/2010 | Bouvier et al. |
| 7,892,080 B1 * | 2/2011 | Dahl .............................. 463/10 |
| 7,921,059 B2 | 4/2011 | Chicks et al. |
| 2002/0118121 A1 | 8/2002 | Lehrman et al. |
| 2003/0109258 A1 | 6/2003 | Mantyjarvi et al. |

(Continued)

OTHER PUBLICATIONS

"Sensor Fusion," <www.u-dynamics.com>, accessed Aug. 29, 2008, 2 pages.

(Continued)

*Primary Examiner* — Kevin Y Kim
(74) *Attorney, Agent, or Firm* — Blakely, Sokoloff, Taylor & Zafman LLP; Judith A. Szepesi (57) ABSTRACT

A method and apparatus for rolling at least one die comprises determining an initial location of the die, and receiving an initialization movement. The method further comprises utilizing accelerometer data from a user shaking a controller, and determining a final location for the at least one die based on the accelerometer data and the initial location data.

21 Claims, 6 Drawing Sheets

(56) References Cited

U.S. PATENT DOCUMENTS

| | | | |
|---|---|---|---|
| 2005/0046639 | A1 | 3/2005 | Leather |
| 2005/0202934 | A1 | 9/2005 | Olrik et al. |
| 2005/0210300 | A1 | 9/2005 | Song et al. |
| 2005/0212767 | A1 | 9/2005 | Marvit et al. |
| 2005/0219223 | A1 | 10/2005 | Kotzin et al. |
| 2005/0222801 | A1 | 10/2005 | Wulff et al. |
| 2006/0063980 | A1 | 3/2006 | Hwang et al. |
| 2006/0064276 | A1 | 3/2006 | Ren et al. |
| 2006/0149516 | A1* | 7/2006 | Bond et al. .................. 703/6 |
| 2006/0161377 | A1 | 7/2006 | Rakkola et al. |
| 2006/0164382 | A1 | 7/2006 | Kulas et al. |
| 2006/0181537 | A1 | 8/2006 | Vasan et al. |
| 2006/0259268 | A1 | 11/2006 | Vock et al. |
| 2006/0284979 | A1 | 12/2006 | Clarkson |
| 2007/0038364 | A1 | 2/2007 | Lee et al. |
| 2007/0073482 | A1 | 3/2007 | Churchill et al. |
| 2007/0125852 | A1 | 6/2007 | Rosenberg |
| 2007/0130582 | A1 | 6/2007 | Chang et al. |
| 2007/0145680 | A1* | 6/2007 | Rosenberg ............ 273/138.1 |
| 2007/0150136 | A1 | 6/2007 | Doll et al. |
| 2007/0213126 | A1 | 9/2007 | Deutsch et al. |
| 2007/0259716 | A1 | 11/2007 | Mattice et al. |
| 2007/0259717 | A1* | 11/2007 | Mattice et al. ............ 463/36 |
| 2007/0260482 | A1 | 11/2007 | Nurmela et al. |
| 2007/0269198 | A1 | 11/2007 | Park et al. |
| 2008/0010539 | A1 | 1/2008 | Roth |
| 2008/0028341 | A1 | 1/2008 | Szeliski et al. |
| 2008/0174598 | A1 | 7/2008 | Risenhoover |
| 2009/0047645 | A1 | 2/2009 | Dibenedetto et al. |
| 2009/0124348 | A1* | 5/2009 | Yoseloff et al. ............ 463/22 |
| 2009/0138654 | A1 | 5/2009 | Sutardja |
| 2009/0310851 | A1 | 12/2009 | Arcas et al. |
| 2011/0040568 | A1 | 2/2011 | Dutton et al. |

OTHER PUBLICATIONS

Weinberg, Harvey, "MEMS Motion Sensors Boost Handset Reliability" Jun. 2006, <http://www.mwrf.com/Articles/Print.cfm?ArticleID=12740>, Feb. 21, 2007, 3 pages.

Anderson, Ian, et al, "Shakra: Tracking and Sharing Daily Activity Levels with Unaugmented Mobile Phones," Mobile Netw Appl, Aug. 3, 2007, pp. 185-199.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing MEMS Accelerometers and Low Power Microcontroller," IEEE EMBS Special Topic Conference on Microtechnologies in Medicine and Biology, May 12-15, 2005, pp. 92-93.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

Healey, Jennifer, et al, "Wearable Wellness Monitoring Using ECG and Accelerometer Data," IEEE Int. Symposium on Wearable Computers (ISWC'05), 2005, 2 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.

Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.

Milenkovic, Milena, et al, "An Accelerometer-Based Physical Rehabilitation System," IEEE SouthEastern Symposium on System Theory, 2002, pp. 57-60.

Otto, Chris, et al, "System Architecture of a Wireless Body Area Sensor Network for Ubiquitous Health Monitoring," Journal of Mobile Multimedia, vol. 1, No. 4, 2006, pp. 307-326.

Park, Chulsung, et al, "Eco: An Ultra-Compact Low-Power Wireless Sensor Node for Real-Time Motion Monitoring," IEEE Int. Symp. on Information Processing in Sensor Networks, 2005, pp. 398-403.

Shen, Chien-Lung, et al, "Wearable Band Using a Fabric-Based Sensor for Exercise ECG Monitoring," IEEE Int. Symp. on Wearable Computers, 2006, 2 pages.

Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.

Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.

Wu, Winston H, et al, "Context-Aware Sensing of Physiological Signals," IEEE Int. Conf. on Engineering for Medicine and Biology, Aug. 23-26, 2007, pp. 5271-5275.

Hwang, Jane, et al, "Hand-Held Virtual Reality: A Feasibility Study," In Proceedings of the ACM Symposium on Virtual Reality Software and Technology (VRST '06), 2006, pp. 356-363.

Frisvad, Jeppe Revall, et al, "Lighting Effects for Mobile Games," In Proceedings of {SIGARD}, 2005, 6 pages.

Jacorre Design Studio, "Animated Shine," <http://replay.waybackmachine.org/20070522062535/http://www.jacorre.com/design/animiatedshine.htm>, Archived May 22, 2007, Retrieved Apr. 5, 2011, 9 pages.

Macgregor, Ken, et al, "MuttZ: An Interactive Cellphone Game," Technical Report CS04-26-00, Department of Computer Science, University of Cape Town, Oct. 21, 2004, 4 pages.

* cited by examiner

METHOD AND APPARATUS TO PROVIDE A DICE APPLICATION

RELATED APPLICATION

The present application claims priority to U.S. Provisional Application Ser. No. 61/060,771 filed on Jun. 11, 2008, and incorporated herein by reference in its entirety.

FIELD OF THE INVENTION

The present invention relates to dice applications, and more particularly to dice application for systems including an accelerometer.

BACKGROUND

Dice applications are very popular on various devices. They range from simple applications that enable a user to roll dice, to complex games which provide a computerized opponent.

Generally, dice game applications utilize a random number generator to generate an "end value" for the dice being displayed. Numerous classic dice games have been re-implemented as computer games, such as Yahtzee, and many others.

SUMMARY

A method and apparatus for rolling at least one die comprises determining an initial location of the die, and receiving an initialization movement. The method further comprises utilizing accelerometer data from a user shaking a controller, and determining a final location for the at least one die based on the accelerometer data and the initial location data.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is providing a physics engine based die roll system on a handheld device, for games and other uses. In one embodiment, the system utilizes a full physics engine with real 3-dimensional dice objects that get moved in accordance to the accelerometer readings of the handheld device. This is designed to replicate the real motion and collisions of the dice as if they were in a container being rolled in the user's hand. Unlike prior art dice games, the dice are controlled not by just a random number generator but by being 3-dimensional simulated dice objects in a physics engine that responds accurately to the users' shakes of the handheld device as measured by an accelerometer or other motion sensor. To the user, this feels as if they are actually rolling a set of real-world dice. In one embodiment, the display and sounds provided to the user further enhance the feeling of the dice's realness. The system may be used in any application that utilizes dice, including various dice games.

In one embodiment, a dice poker game is provided. The user can play dice poker against one or more opponents. These opponents may be other users or computer-based 'virtual players' or a combination of both. In one embodiment, multiple users may play against one another over a wireless connection (Bluetooth, WiFi, etc.). In an alternate embodiment, multiple users may play against one another using the same device, passing the device between users. By way of example, the embodiment of a single user playing against a computer-based 'virtual player' (also referred to as dealer in this case) will be described. Each player (the user and the dealer) has three rolls per round, in one embodiment. Before each roll, each player sees what dice the opponent currently has and can make a decision based on the opponent's current hand. This leads to a much more interesting game with complex odds that just going for the best hand possible without having any idea of one's opponent's hand.

In one embodiment, the poker dice game flow is as follows. The user rolls first, then the dealer rolls. Alternatively, the first roll is alternated between the two players. Alternatively, the person who lost the last roll goes first. After the dealer rolls, the user picks which dice (0 to 5) to hold and then rolls again. The dealer sees the results of the user's roll, and based on those results, picks which dice (0 to 5) to hold. This repeats, in one embodiment the user and the dealer can roll up to three times each (but may hold all dice and thus skip rolls). In one embodiment, the dealer does not roll if the dealer's hand beats the user's hand after the user's last roll. In one embodiment, the ranking of relative hands is such that the user is never guaranteed to win with any hand (although a five of a kind of 6s is guaranteed to at least be a tie). The described game, of course, may be varied in various ways. Furthermore, the three-dimensional dice rolling may be used in any game or other context.

Figure 1:
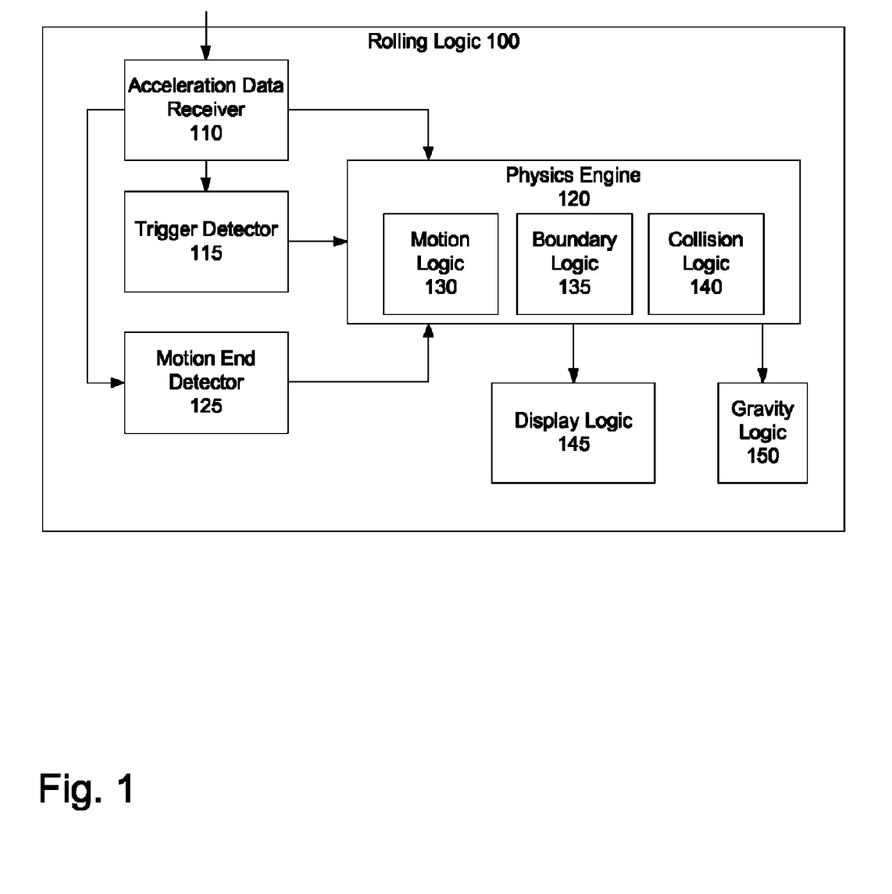
FIG. 1 is a block diagram of one embodiment of a dice rolling logic.

FIG. 1 is a block diagram of one embodiment of a dice rolling logic. The rolling logic 110 in one embodiment is part of a mobile device. Acceleration data receiver 110 receives acceleration data. In one embodiment, acceleration data is received from a 3-dimensional accelerometer. In another embodiment, a 6-dimensional accelerometer, multiple 1 or 2 dimensional accelerometers, a gyroscope, or another mechanism for receiving acceleration data is utilized.

The acceleration data in one embodiment is passed to trigger detector 115, physics engine 120, and motion end detector 125.

The trigger detector 115 determines when a die roll is triggered. In one embodiment, a particular motion pattern is used to trigger a die roll. For example, a back and forth shaking movement may be used as a trigger. In another embodiment, another motion may be used. In one embodiment, the trigger may be selection of a button or another user interface interaction (e.g. not motion-based). In another embodiment, the die roll trigger is the detection of a motion above a threshold, when the dice application is in use. In one embodiment, the motion speed and vigor threshold for triggering the roll is set to be comparable to the threshold for shaking dice in a cup.

When trigger detector 115 detects a die roll trigger, the physics engine 120 is triggered. Physics engine uses the acceleration data from motion logic 130 to calculate the motion of one or more dice within the application. These dice, in one embodiment, are 3-dimensional simulated dice objects that respond accurately to the users' motions with the handheld device. In one embodiment, motion logic 130 compensates for the motion of gravity, so it is solely the user's own motions that control the dice.

Boundary logic 135 identifies boundaries, e.g. the range of motion permitted for the dice objects. In one embodiment, the boundaries defined by boundary logic 135 coincide with the screen of the handheld device. In one embodiment, another boundary may be defined. For example, in one embodiment, a boundary that appears to be a dice cup is used as the boundary. The shape of the boundary is arbitrary, as are its physical characteristics. In one embodiment, the boundary data includes a shape of the boundary, and the physical rebound characteristics provided by the boundary. In one embodiment, a leather dice cup provides the rebound characteristics implemented. In another embodiment, the boundary does not provide any rebound characteristics, e.g. is a frictionless surface that simply reorients the motion of the dice. Boundary logic 135 provides boundary data to motion logic 130, enabling motion logic to correctly calculate the result of boundary collisions.

Collision logic 140 is used to calculate the results of collisions between objects, and objects and the boundary. In one embodiment, the physics engine 120 is the Open Dynamics Engine (ODE). Its two main components are a rigid body dynamics simulation engine (e.g. motion logic 130) and a collision detection engine (e.g. collision logic 140).

Motion end detector 125 in one embodiment detects when the user has stopped shaking the handheld device, to end the die roll. Generally speaking humans cannot hold perfectly still. Therefore, motion end detector 125 ensures that the die roll is ended even though the acceleration data continues to come in with changes in direction and motion. In one embodiment, when motions stop being above a predefined threshold, motion end detector 125 indicates that the die roll has ended. In another embodiment, the motion end detector 125 determines when the shaking has slowed, or when a particular amount of time has elapsed to assume termination of the die roll.

The motion end detector 125 triggers the removal of the acceleration data from physics engine 120, enabling the dice to settle into a final position. In one embodiment, if the dice initially end up in a position that is not appropriate, e.g. not resting on a face, but instead balanced on a corner or an edge, gravity logic 150 is used to change the gravity value input to physics engine 120. This forces the die to fall into an appropriate final position.

Display logic 145 may be used to display the dice prior to, during, and after the roll. Display logic 145, in one embodiment provides a user interface, in one embodiment, enabling a user to select dice. In one embodiment, the shape of the dice selected represents the dice features used by the physics engine to calculate the motions of the dice. That is, a die with curved corners interacts differently with the ground and with other dice compared to a dice with sharp corners. In one embodiment, the material of the dice may further be varied, and represented by the physics engine. For example, dice may be made of various materials ranging from woods, to plastics, to stone, or other materials. Each of these materials has a characteristic hardness and elasticity which would impact how these dice interact with each other. Therefore, in one embodiment, the dice available to the user have these factors defined. And, in one embodiment, the user may modify these factors.

Note that while "dice" are generally cubes, dice of other shapes may also be used. For example, there are cylindrical dice with a hexagonal face, pyramid-shaped dice, etc. Dice may also have more or fewer faces than six. For example, there may be pyramidal dice having only five sides, etc. The shapes which may be used for the dice are not restricted, in one embodiment.

Figure 2:
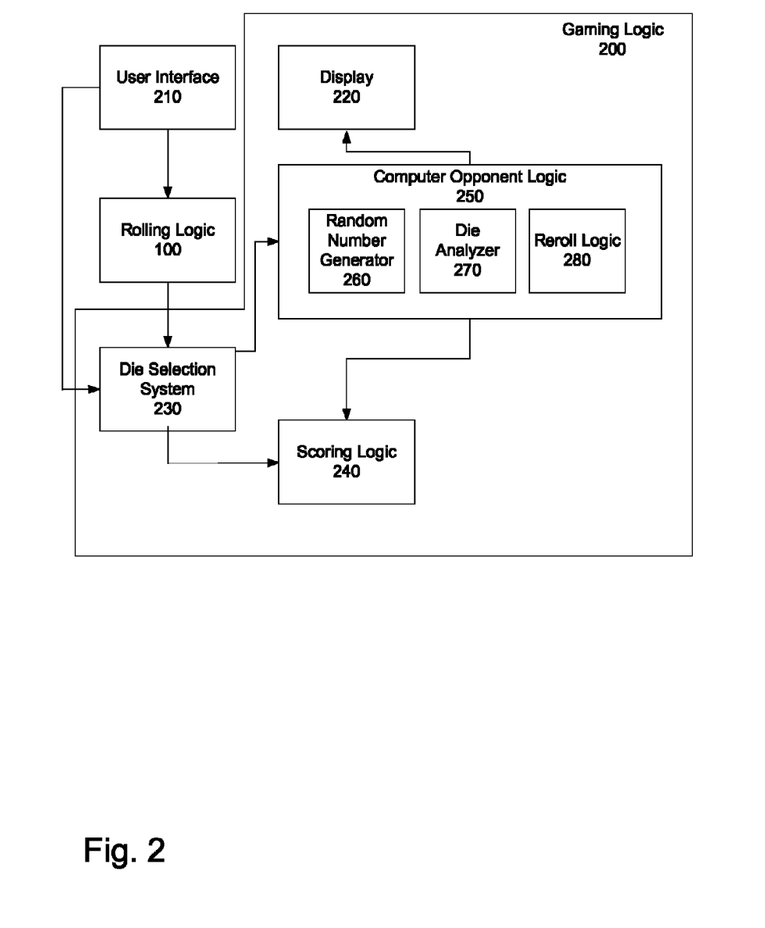
FIG. 2 is a block diagram of one embodiment of a dice gaming logic.

FIG. 2 is a block diagram of one embodiment of a dice gaming logic. Gaming logic 200 enables a user to play a game, against one or more opponents, or by him or herself.

Rolling logic, described with respect to FIG. 1, is used in one embodiment to control the roll of the dice for the user. As noted with respect to FIG. 1, rolling logic receives as an input accelerometer readings.

In one embodiment, computer opponent logic 250 utilizes a traditional random number generator 260 to generate the results for its dice. In another embodiment, an amplified version of the user's own inadvertent motions may be used to calculate the rolls. In one embodiment, the rolls of the computer opponent(s) are shown in the system. In another embodiment, they are not shown, and only the result is shown. Die analyzer 270 determines the result, in the context of the game rules. In one embodiment, the system may include multiple games, each with its own rules. Reroll logic 280 triggers the rerolling of one or more dice by the computer opponent, when appropriate. In one embodiment, computer opponent logic 250 utilizes scoring logic 240 to compare the user's score, the computer opponent's own score, and the possible range of outcomes based on rerolling, to select which dice to keep and which to re-roll.

Figure 3:
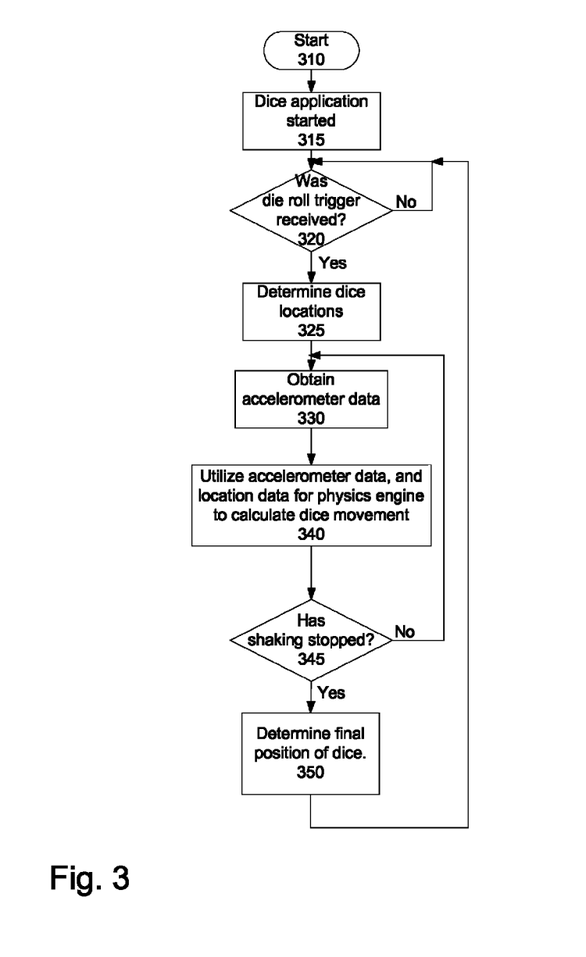
FIG. 3 is a flowchart of one embodiment of rolling one or more dice.

FIG. 3 is a flowchart of one embodiment of rolling one or more dice. At block 315, the dice application is started. In one embodiment, the dice start in a default location when the application is initialized. In one embodiment, the default location is distributed evenly on the table. In another embodiment, there is no default location and the initial location is a drop, e.g. the system utilizes the dice logic to "drop" the dice from a preset height.

At block 320, the process determines whether a die roll trigger was received. A die roll trigger may be a particular shaking motion, a selection of a button or other user interface mechanism, a tap, or a sufficiently vigorous shaking of the device, etc. If no, the system continues to monitor for the trigger.

If a die rolling trigger is received, at block 325, the current location(s) of the one or more dice is determined.

At block 330 accelerometer data is obtained. In one embodiment, accelerometer data is continuously fed into a physics engine, once the trigger is received.

At block 340, the accelerometer data and location data are used to calculate the movement of the one or more dice.

At block 345, the process determines whether the shaking has stopped. In one embodiment, when the motion data is below a certain threshold, the shaking is considered to be stopped. In one embodiment, the system may cut off the motion data after a certain amount of time has elapsed. If not, the process returns to block 330, to continue obtaining accelerometer data and calculate further die movements.

Once the shaking is stopped, the final position of the dice is determined, at block 350. The final results, in one embodiment, are shown to the user. In one embodiment, the entire shaking is visible to the user, providing visual feedback and entertainment while the user is shaking the dice. In one embodiment, the system automatically calculates the resultant dice values, in the context of the game rules being utilized. In one embodiment, the user may further be informed of the outcome of the roll. For example, there may be a text display stating that the user has rolled "Five of a kind" or "A full house," etc. The process then returns to block 320, to determine whether another shaking trigger is received.

Figure 4:
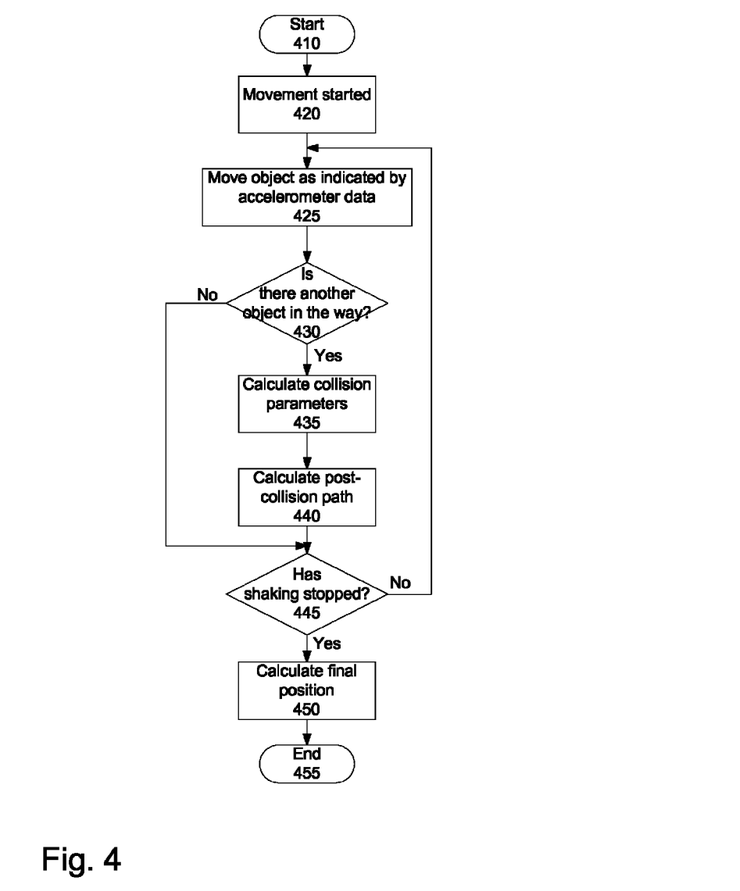
FIG. 4 is a flowchart of one embodiment of die movement.

FIG. 4 is a flowchart of one embodiment of die movement. In one embodiment, this represents block 340 of FIG. 3. This flowchart, in one embodiment, represents the motion calculations for a single die. The process starts at block 410. At block 420, the movement is started.

At block 425, the object is moved as indicated by the accelerometer data. In one embodiment, the original location/orientation is used as the starting condition for the physics engine.

At block 430, the process determines whether there is another object in the way. The other object may be another die, a boundary region, or another object. For example, in one embodiment, the dice area may include fixed decorative items which are not flat to the ground, to provide added interest. If there is no other object in the way, the process continues to block 445. At block 445, the process determines whether the shaking has stopped. In one embodiment, when the motion level falls below a certain threshold, the accelerometer data is removed from the dice entirely. In another embodiment, the dice are left to naturally settle as the level of motion is decreased below the level required to overcome gravity.

If the shaking has not yet stopped, the process returns to block 425, to continue moving the object in accordance with the accelerometer data. If the shaking has stopped, at block 445, the process at block 450 calculates the final position of the die. In one embodiment, a final value is also calculated. The final value is the game-specific value attached to the final position of the dice. The process then ends at block 455.

If there is another object in the way, at block 435, collision parameters are calculated 435. At block 440, the post-collision path and speed of movement is calculated. The collision calculation further utilizes the hardness, relative size, and elasticity data to calculate how the collision would impact the motion of the die. In one embodiment, accelerometer data received during the collision is also added to the calculations.

The process then continues to block 445, to determine whether the shaking has stopped. If not, the process then returns to block 425, to continue moving the object in accordance with the accelerometer data. Otherwise, at block 450, the final position/value of the die is calculated and the process ends.

Figure 5:
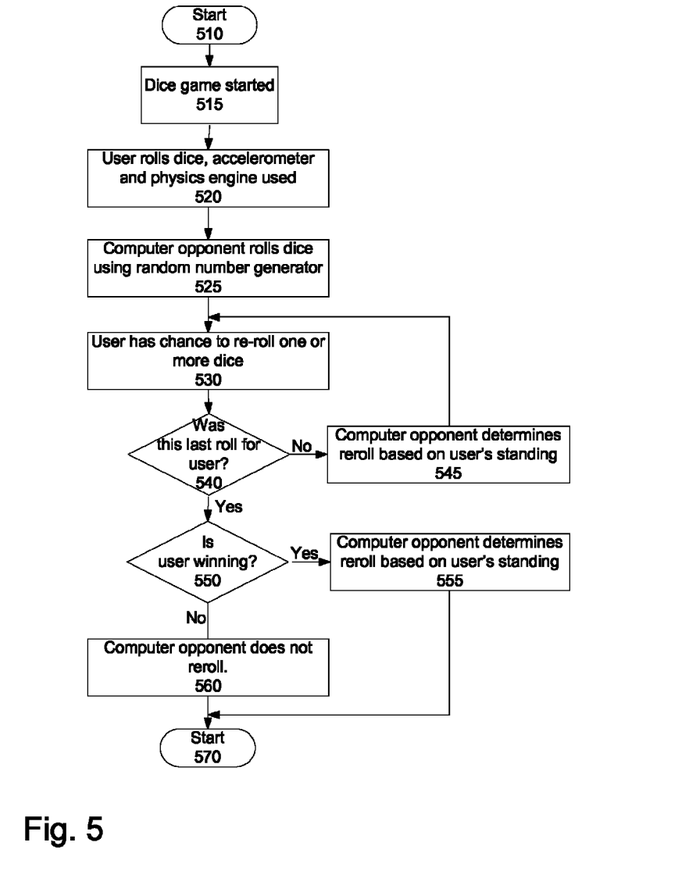
FIG. 5 is a flowchart of one embodiment of a dice game.

FIG. 5 is a flowchart of one embodiment of a dice game. This exemplary game is a game played against a single computer opponent. Of course, all types of other games may be implemented as well within the scope of this disclosure. The process starts at block 510. The dice game is started, at block 515. The dice game, in one embodiment, is a poker-type game.

At block 520, the user rolls the dice. The accelerometer data is used with a physics engine, as described above. The user at some point stops rolling the dice, and the dice find their final position. In one embodiment, if the user shakes the dice for more than a present period—in one embodiment one minute—the system disconnects the accelerometer data from the physics engine, to terminate the dice roll. In another embodiment, the dice may be rolled indefinitely.

At block 525, the computer opponent rolls the dice. In one embodiment, a random number generator is used. In one embodiment, the random number generator is used to generate a string of random numbers which are then used as inputs into the physics engine. In another embodiment, the traditional random number generator for dice throwing is used. In another embodiment, data from the accelerometer, based on the user's inadvertent motions, is used as input for the computer opponent's rolls.

At block 530, the user has an opportunity to re-roll one or more dice. In one embodiment, the game includes a plurality of hands, each hand having a relative strength. In one embodiment, for a five dice game, the ordering of the values is: five of a kind, four of a kind, straight, full house, three of a kind, two pairs, two of a kind. Generally, the user would select a goal hand, based on the results of the first roll, and keep some dice and re-roll others.

At block 540, the process determines whether this was the last roll for the user. If not, at block 545, the computer opponent determines which dice to keep and which to reroll, based on the user's hand and the dice rolled by the computer opponent. The process then returns to block 530, to permit the user to reroll.

If this was the last roll for the user, the process continues to block 550. At block 550, the process compares the user's final hand (since there are no further re-rolls for the user) with the computer opponent's current hand. If the user is winning, the computer opponent rerolls one or more dice. The dice are selected so that it is possible that the computer opponent will beat the user. For example, if the computer opponent has a straight, and the user has a four of a kind, the computer opponent would reroll four of the dice—keeping one die, generally of the highest value—because there is a small chance that the computer opponent would roll a four or five of a kind and thus beat the user.

If the computer opponent is ahead, the computer opponent does not reroll, in one embodiment. In one embodiment, the first roll is alternated between the computer opponent and the user. In another embodiment, the user always has the first roll. In another embodiment, the user may select whether he or she prefers the first roll or the final roll.

The process then ends at block 570.

While this was described as a game between a single user and a single computer opponent, the game may be implemented between multiple users, or with multiple users and computer opponents.

In one embodiment, users may play with other players who are remote from them—e.g. via a network. In one embodiment, the system would still utilize the physics engine for the users' rolls. In one embodiment, for remote games, the user sees their own roll, using the on-board physics engine. However, the other user's rolls are off-screen showing only the result. In another embodiment, for remote games, the other user's roll is also shown. In one embodiment, this is accomplished by sending the dice data to the user's local system. In one embodiment, the dice roll display may be sent as data to the user's system. In one embodiment, the dice may be reproduced on the user's system, and the accelerometer data may be sent to re-produce the data on the user's system. This may, in one embodiment, introduce a short time delay to ensure that minor lag introduced by the network does not skew the results.

Figure 6:
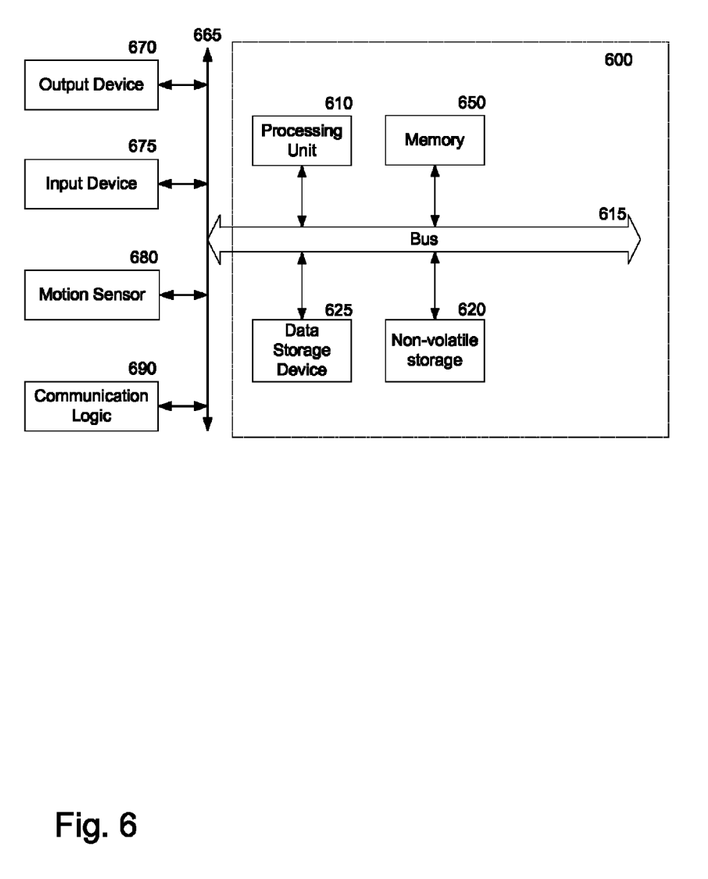
FIG. 6 is a block diagram of one embodiment of a computer system which may be used with the present invention.

FIG. 6 is a block diagram of one embodiment of a particular machine or computer system which may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The physics engine described above is in the processor 610, in one embodiment. The system further comprises a random access memory (RAM) or other volatile storage device 650 (referred to as memory), coupled to bus 615 for storing information and instructions to be executed by processor 610. The volatile storage device 650 stores temporary data such as a die's current location and visual image. In another embodiment, this may be stored in a cache on the processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display 670, such as a liquid crystal display (LCD), organic LCD, or other display mechanism 670 coupled to bus 615 through bus 665 for displaying information to a computer user. The information displayed includes the dice, including while the dice are being shaken their instantaneous positions. An input device 675 is also coupled to bus 615 through bus 665 for communicating information and command selections to processor 610. The input device 675 may include a real keyboard, a virtual keyboard, a button, a touch screen, or another reselection mechanism that enables the user to interact with the device. Input device 675 may further provide direction information and command selections to processor 610, and control the cursor location and movement on display device 670.

Motion sensor 680 is also coupled to the computer system 600. Motion sensor 680 may be a three dimensional accelerometer, multiple two dimensional accelerometers, a six dimensional accelerometer, a gyroscope, or another device capable of detecting the user's motions. The motion sensor 680 may be used, in one embodiment, in order to provide input to the processor. In one embodiment, motion sensor 680 is used in rolling decide, as described above. In one embodiment, the motion sensor 680 may further be used as a user input device, e.g. to control the device in other ways.

Another device, which may optionally be coupled to computer system 600, is a communication device 690 for accessing other nodes of a distributed system via a network. The communication device 690 in one embodiment is a cell phone communication device which can access the cell phone network. In another embodiment, the communication device 690 may include any of a number of commercially available networking peripheral devices such as those used for coupling to a wired network, a wireless network, a personal area network, or any other type of network.

It will be appreciated by those of ordinary skill in the art that the particular machine described above is used with the system, however its configuration may be changed for various purposes according to the particular implementation. The rolling logic 100 and gaming logic 200 can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. The rolling logic 100 and gaming logic 200 is control logic or software which may be resident on an article of manufacture comprising a computer readable medium having computer readable program code embodied therein and being readable by the mass storage device 625 and for causing the processor 610 to operate in accordance with the methods and teachings herein.

The present invention is embodied in a handheld or portable device. In one embodiment, the present invention is embodied in a cellular telephone, which includes an interface for permitting applications including dice. In one embodiment, the present invention is embodied in a personal digital assistant, or other portable computing device. The control logic or software implementing the present invention can be stored on any machine-readable medium locally or remotely accessible to processor 610. A machine-readable medium includes any mechanism for storing information in a form readable by a machine (e.g. a computer). For example, a machine readable medium includes read-only memory (ROM), random access memory (RAM), magnetic disk storage media, optical storage media, flash memory devices. In one embodiment, software implementing the present invention may be sent as propagated electrical, optical, acoustical, or other signals.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for rolling at least one die on a handheld device comprising:
    determining an initial location of the die;
    receiving an initialization command;
    utilizing accelerometer data from a user shaking the handheld device to determine die movement;
    determining a final location for the at least one die based on the accelerometer data, motion physics, and the initial location data; and
    such that when the accelerometer data is below a threshold, zeroing out the accelerometer data to enable the die to settle into the final location.

2. The method of claim 1, further comprising:
    identifying a collision between the die and another object; and
    using collision physics to calculate a resultant motion vector; and
    determining the final location based on the accelerometer data, the resultant motion vector, and the initial location data.

3. The method of claim 2, wherein the other object comprises one or more of: a bounding area, another die, and a different object.

4. The method of claim 3, wherein the bounding area comprises an edge of a screen showing the die.

5. The method of claim 1, further comprising:
    enabling a user to play a game against a computerized opponent, wherein a random number generator is used for the computerized opponent.

6. The method of claim 5, further comprising:
    generating a random initial accelerometer vector for the computerized opponent, the random initial accelerometer vector utilized along with collision physics to determine a roll for the computerized opponent.

7. The method of claim 5, wherein the computerized opponent determines based on the user's dice what to re-roll.

8. The method of claim 1, further comprising:
determining when the final location of the die is not flat, and increasing a gravity component to force a new final location that is flat.

9. The method of claim 1, wherein the initialization command comprises a motion pattern.

10. The method of claim 1, further comprising:
enabling a user to play a game against at least one other player who is remote from the user.

11. The method of claim 10, wherein a dice roll display of the at least one other player is sent to the user's handheld device.

12. The method of claim 10, wherein accelerometer data from the at least one other player is sent to the user's handheld device to reproduce a final location for at least one die of the other player based on the accelerometer data.

13. A computer-implemented system to roll at least one die on a handheld device comprising:
a rolling logic to identify an initial location of the die;
a trigger detection logic to receive an initialization by a user shaking the handheld device;
a physics engine to calculate an initial acceleration vector, start the motion of the die in accordance with the initial acceleration vector, and utilize accelerometer data from a user shaking the handheld device and to determine a final location for the at least one die based on the initial acceleration vector and the initial location data and the accelerometer data; and
a motion end detector to detect when the accelerometer data is below a threshold, and zeroing out the accelerometer data from the physics engine to enable the at least one die to settle into the final location.

14. The computer-implemented system of claim 13, wherein the physics engine further comprises:
a collision logic to identify a collision between the die and another object; and
a motion logic to use collision physics to calculate a resultant motion vector and determine the final location based on the accelerometer data, the resultant motion vector, and the initial location data.

15. The computer-implemented system of claim 13, further comprising:

a gravity logic to receive a determination that the final location of the die is not on a face, and increasing a gravity component to force a new final location that is on the face of the die.

16. The computer-implemented system of claim 14, further comprising:
a boundary logic to identify one or more boundaries of the handheld device.

17. A system comprising:
a storage medium;
a processor associated with the storage medium and configured to:
determine an initial location of the die;
receive an initialization command;
utilize accelerometer data from a user shaking the handheld device to determine an initial acceleration vector;
determine a final location for the at least one die based on the initial accelerometer vector and the initial location data; and
determine when the final location of the die is not flat, and increase a gravity component to force a new final location that is flat.

18. The system of claim 17, further comprising:
a motion sensor coupled to the system to detect the user shaking the handheld device; and
the processor further configured to detect when the user has stopped deliberately shaking the handheld device, and to trigger the removal of the accelerometer data to enable the at least one die to settle into the final location.

19. The system of claim 17, further comprising the processor enabling a user to play a game against a computerized opponent, wherein a random number generator is used for the computerized opponent.

20. The system of claim 19, further comprising the processor generating random accelerometer inputs for the computerized opponent, the random accelerometer inputs utilized to determine a roll for the computerized opponent.

21. The system of claim 17, further comprising the processor configured to:
identify a collision between the die and another object; and
use collision physics to calculate a resultant motion vector and determine the final location based on the initial accelerometer vector, the resultant motion vector, and the initial location data.

* * * * *